United States Patent
Plundrich et al.

(10) Patent No.: US 6,716,535 B1
(45) Date of Patent: Apr. 6, 2004

(54) METHOD FOR GLUING TOGETHER LARGE-SURFACED WORKPIECES WITH OPPOSED EXPANSION COEFFICIENTS IN A STABLE MANNER AND COMPOSITE STRUCTURE PRODUCED IN THIS WAY

(75) Inventors: Winfried Plundrich, Germering (DE); Ernst Wipfelder, Munich (DE); Peter Hein, Berlin (DE); Ralf Wilcke, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 368 days.

(21) Appl. No.: 09/890,235

(22) PCT Filed: Jan. 20, 2001

(86) PCT No.: PCT/DE00/00170

§ 371 (c)(1), (2), (4) Date: Oct. 17, 2002

(87) PCT Pub. No.: WO00/44849

PCT Pub. Date: Aug. 3, 2000

(30) Foreign Application Priority Data

Jan. 28, 1999 (DE) .......................... 199 03 357

(51) Int. Cl.⁷ .............................. B32B 9/04; B32B 15/06
(52) U.S. Cl. ...................... 428/448; 428/447; 428/450; 428/332; 428/625; 156/329
(58) Field of Search ................................. 428/615, 621, 428/624, 625, 626, 446, 447, 448, 450, 332; 156/329

(56) References Cited

U.S. PATENT DOCUMENTS

| 4,904,414 A | 2/1990 | Peltz et al. |
| 4,978,696 A | 12/1990 | Clark et al. |
| 6,613,438 B1 * | 9/2003 | Hein et al. ................ 428/414 |

FOREIGN PATENT DOCUMENTS

| DE | 195 38 468 A1 | 4/1997 |
| EP | 0 432 502 A2 | 6/1991 |
| EP | 0 638 461 A1 | 2/1995 |

OTHER PUBLICATIONS

Magens, K., "Permasyn® –A Permanent–Field, Coverter–Fed Motor for Propulsion Systems", Jahrbuch der Schiffbautechnischen Gesellschaft, 81:221–227 (1997).

* cited by examiner

*Primary Examiner*—Robert Dawson
*Assistant Examiner*—Michael J Feely
(74) *Attorney, Agent, or Firm*—Morrison & Foerster LLP

(57) ABSTRACT

The invention relates to the field of machine elements for designing a composite of two parts, one of which is a rare-earth permanent magnet and the other of which is a metallic support.

2 Claims, No Drawings

METHOD FOR GLUING TOGETHER LARGE-SURFACED WORKPIECES WITH OPPOSED EXPANSION COEFFICIENTS IN A STABLE MANNER AND COMPOSITE STRUCTURE PRODUCED IN THIS WAY

CLAIM FOR PRIORITY

This application claims priority to International Application No. PCT/DE00/00170 which was published in the German language on Aug. 3, 2000.

TECHNICAL FIELD OF THE INVENTION

The invention relates to the field of machine elements for designing a composite of two parts, and in particular, to composite of which one is a rare-earth permanent magnet and the other is a metallic support.

BACKGROUND OF THE INVENTION

In a known composite of this type (DE 195 38 468 A1), a first part in the form of a cuboid permanent magnet is screwed onto a second part in the form of a cylindrical axle of a magnetic clutch. An epoxy resin-based glue which has a dual curing mechanism is used for this.

The invention is based on the discovery that such a glue is not, however, suitable for the permanent bonding of certain large-surfaced parts, such as e.g. a rare-earth permanent magnet and an iron pole of an electrical machine, because the thermomechanical property level of the epoxy resin glue is not matched in such a way, to the opposed thermal expansion coefficients of the elements to be used, that the elasticity of the bond produced in this way could meet the extreme requirements which exist whenever two glued parts with an opposed thermal expansion coefficient are used in a temperature range of from −30° C. to 150° C. Such conditions are encountered, for example, in permanent-field synchronous motors for the propulsion systems of ships (Jahrbuch der schiffbautechnischen Gesellschaft [Shipbuilders' yearbook] 81 (1987), pp. 221 to 227). Depending on the size of the glued permanent magnets, and therefore on the size of the joint surface, thermally induced length-change differences between the glued parts of up to a few hundred $\mu$m can occur; the elasticity of the glued point or bond should permit such length-change differences.

SUMMARY OF THE INVENTION

In one embodiment of the invention, there is a composite having two parts. The composite being formed using a thermally curable glue that forms a spaced joint which includes for example, a rare-earth permanent magnet having a joint surface of at least 1000 mm$^2$ and a metallic support which is a ferromagnetic pole of an electrical machine. The glue includes an addition-crosslinking, single-component and self-adhesive silicone glue, the glue layer having a layer thickness of about 70 to 150 $\mu$m and includes spherical spacers in an amount of about 0.5 to about 5% by weight of the glue mass.

In one aspect of the invention, the diameter of the spacers and a thickness of the glue layer is between about 100 and about 125 $\mu$m.

DETAILED DESCRIPTION OF THE INVENTION

The invention is based on the discovery that a glue, as described in the Background of the Invention, is not suitable for the permanent bonding of certain large-surfaced parts, such as a rare-earth permanent magnet and an iron pole of an electrical machine. This is because the thermomechanical property level of the epoxy resin glue is not matched in such a way, to the opposed thermal expansion coefficients of the elements to be used, that the elasticity of the bond produced could meet the extreme requirements which exist whenever two glued parts with an opposed thermal expansion coefficient are used in a temperature range of from −30° C. to 150° C. Such conditions are encountered, for example, in permanent-field synchronous motors for the propulsion systems of ships (Jahrbuch der schiffbautechnischen Gesellschaft [Shipbuilders' yearbook] 81 (1987), pp. 221 to 227). Depending on the size of the glued permanent magnets, and therefore on the size of the joint surface, thermally induced length-change differences between the glued parts of up to a few hundred $\mu$m can occur. The elasticity of the glued point or bond should permit such length-change differences.

The invention discloses design of a composite, in such a way as to provide a composite which is stable over a wide temperature range even for parts with an opposed expansion coefficient and a large joint surface.

In one embodiment, a joint surface of the rare-earth permanent magnet of at least 1000 mm$^2$ and a ferromagnetic pole of an electrical machine as metallic support, the glue includes an addition-crosslinking, single-component and self-adhesive silicone glue, the glue layer having a layer thickness of from about 70 to about 150 $\mu$m and includes spherical spacers in an amount of from 0.5 to 5% by weight of the glue mass.

Such a joint is distinguished by a highly elastic bond that is stable over a wide temperature range, with very good adhesion on the two parts. To adjust the spaced joint, spacers in the form of glass and/or ceramic spheres have proved advantageous. The glass and/or ceramic spheres are either incorporated into the silicone glue before it is applied to one of the parts, or is scattered over the pre-applied silicone glue bed while the joint is still open. Spacers having a thickness of between about 100 and about 125 $\mu$m are preferably used. The proportion in the silicone adhesive is preferably from 0.75 to 3, in particular approximately 1% by weight, expressed in terms of the total silicone glue mass.

When producing the composite, it is sufficient if the silicone glue is applied to one of the parts to be bonded. Application of the glue can be made to either of the two parts. The silicone glue is in this case, e.g. spread or applied using a dispenser technique to the parts.

A fumed silica, e.g. Aerosil, may be incorporated into the glue intended for the novel composite in an amount of from 0.1 to 20% by weight, preferably from 0.5 to 10% by weight or, particularly preferably, from 2 to 5% by weight, the % by weight referring to the total silicone glue mass. This positively influences the wetting performance of the silicone glue.

Addition-crosslinking, single-component and self-adhesive silicone glues are known per se. A silicone glue sold by the manufacturing company Dow-Corning under the reference "Q 3-6611" is preferably used for the novel composite. This glue is distinguished by a very high tensile strength, high expansion and high tear resistance in the temperature range mentioned in the introduction.

With the design according to the invention, glued composites of an iron pole and a magnetic material, e.g. a rare-earth permanent magnet material produced by powder metallurgy ("VACODYM"), with a glued surface of more than 1000 mm$^2$ can be mastered. The difficulty when producing such composites is that the large-surfaced bonding partners have very different thermal expansion coefficients:

"Vacodym" $-1 \times 10^{-6}$/K in the joint plane iron $14.5 \times 10^{-6}$/K in the joint plane.

Hence, the silicone glue must compensate, in the working temperature range, for length changes which—expressed in terms of the dimensions of the magnetic pieces—may be a few 100 μm. If the elasticity is insufficient, stresses occur in the glue bond so as to cause strength losses and premature failure of the bond. This has been confirmed by shear-strength studies on bonds, especially after exposure to heating cycles.

The production of a composite design according to the invention will be explained below.

An adhesive bed of the addition-crosslinking, single-component, self-adhesive silicone glue Q 3-6611 is first produced on one of the two parts. To that end, the silicone glue is spread over the parts with a layer thickness of about 100–125 μm. Since the silicone glue is a self-adhesive silicone glue, i.e. one provided with an internal adhesive, preliminary priming of the joint surface is not necessary. After the usual degreasing of the substrate surface, e.g. using a solvent, the silicone glue can be spread directly over the part. The wetting performance can be improved further, if required, by adding fumed silica. Glass spheres having a diameter of about 100–125 μm are then scattered over the prepared silicone glue bed in an amount of approximately 1% by weight, expressed in terms of the total silicone glue mass. The second part is then joined onto this layer, a spaced joint with a size equal to the diameter of the glass spheres being created. The final strength of the composite is reached by curing the silicone adhesive for about 2 hours at approximately 150° C.

A composite produced in this way was subjected to a shear-strength study. The shear strength in the initial state, and even after storage for 5 days at 150° C., was more than 5.7 N/mm² irrespective of whether it was measured at room temperature or at 150° C.

The addition-crosslinking silicone glue does not release any byproduct when it crosslinks. The composite produced thereby meets the adhesion requirement >1 N/mm² at 150° C. and fulfils the requirement, with respect to thermal stability, placed on a permanent-field motor for the propulsion systems of ships which have such a composite.

In the crosslinked state, the composite is virtually free of mechanical stresses and provides the requisite strength over the entire temperature range of from –30° C. to 150° C., because the silicone glue crosslinks to form an elastomer with high expansion (250%) and high tear resistance.

What is claimed is:

1. A composite having two parts, the composite being formed using a thermally curable glue that forms a spaced joint, comprising:
   a rare-earth permanent magnet having a joint surface of at least 1000 mm²; and
   a metallic support which is a ferromagnetic pole of an electrical machine, wherein the glue includes an addition-crosslinking, single-component and self-adhesive silicone glue, the glue layer having a layer thickness of about 70 to 150 μm and includes spherical spacers in an amount of about 0.5 to about 5% by weight of the glue mass.

2. The composite as claimed in claim 1, wherein the diameter of the spacers and a thickness of the glue layer is between about 100 and about 125 μm.

* * * * *